United States Patent [19]

Warrow

[11] Patent Number: 4,809,547

[45] Date of Patent: Mar. 7, 1989

[54] MARINE SPEED MEASURING DEVICE

[76] Inventor: Theodore U. Warrow, 400 West Hopkins, Apt. 208 Pontiac, Mich. 48055

[21] Appl. No.: 111,297

[22] Filed: Oct. 22, 1987

[51] Int. Cl.⁴ ............................................. G01C 21/10
[52] U.S. Cl. ........................................................ 73/183
[58] Field of Search ...................... 73/183, 182, 861.63, 73/861.64, 861.44, 720, 721

[56] References Cited

U.S. PATENT DOCUMENTS

| | | | |
|---|---|---|---|
| 2,023,568 | 12/1935 | Albersheim et al. | 73/861.63 |
| 2,573,430 | 10/1951 | Gentile, Jr. | 73/861.64 |
| 2,979,955 | 4/1961 | Shepler | 73/720 |
| 4,472,966 | 9/1984 | Dumestre, III | 73/183 |
| 4,671,109 | 6/1987 | Halmi | 73/861.63 |

FOREIGN PATENT DOCUMENTS 0403579 4/1943 France ................................. 73/182

Primary Examiner—Donald O. Woodiel
Attorney, Agent, or Firm—James M. Deimen

[57] ABSTRACT

A speed measuring device comprising an open ended venturi in a body having a streamlined support adapted for attachment to a boat hull or other large surface immersed in a fluid. Within the support is a cavity for transducers in fluid communication with the venturi to measure static fluid pressures therein. By means of a micro-controller and display the speed of the venturi and attached surface through the fluid can be continuously monitored and distance travelled calculated and displayed. Excessive angular displacement of the surface relative to the direction of movement can also be sensed and displayed in response to the static pressures sensed in the venturi.

4 Claims, 3 Drawing Sheets

4,809,547

MARINE SPEED MEASURING DEVICE

BACKGROUND OF THE INVENTION

The invention pertains to the field of speed measuring devices and, in particular, to devices that measure the speed of a watercraft.

Venturi fluid flow measuring devices of circular or rectangular cross-section are well known in the art for the measurement of liquid in flow meters and gases in ducts.

Examples of circular and rectangular duct venturi devices are disclosed in a series of patents to Halmi including U.S. Pat. Nos. 3,686,946; 3,733,901; 3,733,902; 3,733,903 and 4,516,434 wherein he discloses configurations to minimize flow losses and minimize inaccuracies in measurement. U.S. Pat. No. 4,174,734 to Bradham also discloses a venturi flow meter having the upstream portion defined by a specific mathematical relationship based on a constant rate of acceleration of the fluid flow in the converging section of the venturi.

Venturis are also used for a variety of mixing devices such as carburetors wherein a liquid fuel is drawn into the venturi through a port and vaporized in a stream of air accelerated by the venturi. In the examples above noted the venturi forms a portion of a pipe or duct, round or polygonal in cross-section. The fluid, whether a gas or a liquid is blown or drawn through the pipe or duct by some external means such as a fan or pump. As a part of the duct or pipe the venturi does not move with respect to the duct or pipe.

SUMMARY OF THE INVENTION

The new measuring device comprises a venturi open to the environment at both the downstream and upstream ends and adapted for mounting on or adjacent a substantially flat surface as a boat hull exterior. The venturi includes two static pressure transducers in the wall thereof and in communication with the entrance and the throat of the venturi. The primary purpose of this pair of static pressure transducers is to provide a measure of static pressure differential between the entrance and the throat. The static pressure differential can be converted to an indication of volumetric flow through the venturi by means of well known mathematic theory or, depending on the configuration of the venturi, by means of the more specialized mathematic analyses disclosed in the above referenced patents.

As a speed measuring device attached to a surface the venturi is drawn through the fluid, entrance first, causing the substantially motionless fluid passing into the entrance to be momentarily accelerated as the fluid passes through the throat. The sudden acceleration and momentary velocity reduces the static pressure at the venturi throat providing a measurable pressure differential with the entrance static pressure.

In the preferred embodiment the static pressure transducers convert fluid pressure to electric signals for processing to calculate speed of the boat or other object passing through the fluid. The signals are processed and fed to a display such as a liquid crystal display. By integrating the calculated speed over time the distance travelled can also be displayed. A temperature sensor in the device senses water temperature to provide a water density adjustment to the signal processor.

The device is mounted on the boat hull or adjacent surface for axial flow of fluid into the venturi entrance. With the addition of a third pressure transducer in fluid communication with the venturi adjacent the exit thereof, a continuous measurement of exit static pressure provides, in comparison with the entrance static pressure, a continuous measure of the energy loss or flow efficiency through the venturi. Flow efficiency is maximized with axial inlet fluid flow to the venturi.

DESCRIPTION OF THE PREFERRED EMBODIMENTS

Figure 1:
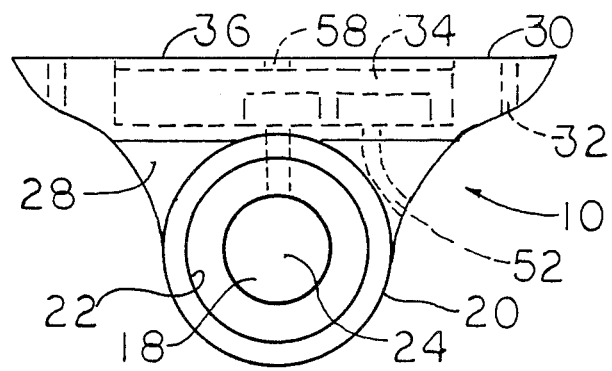
FIG. 1 is an entrance view of the venturi-transducer device.
Figure 2:
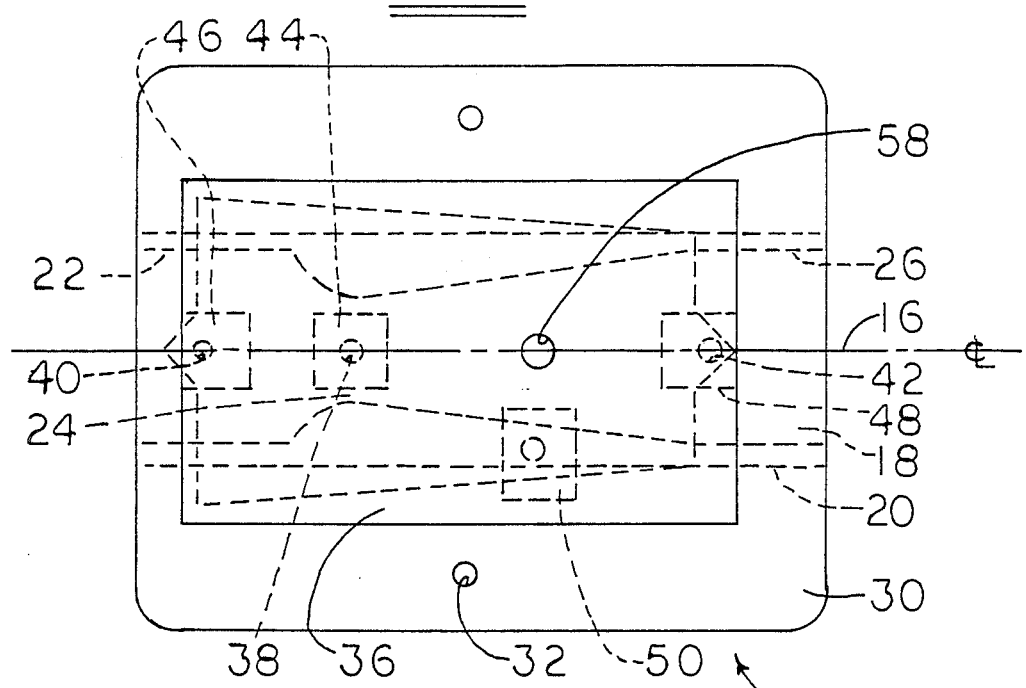
FIG. 2 is a plan view of the venturi transducer device.
Figure 3:
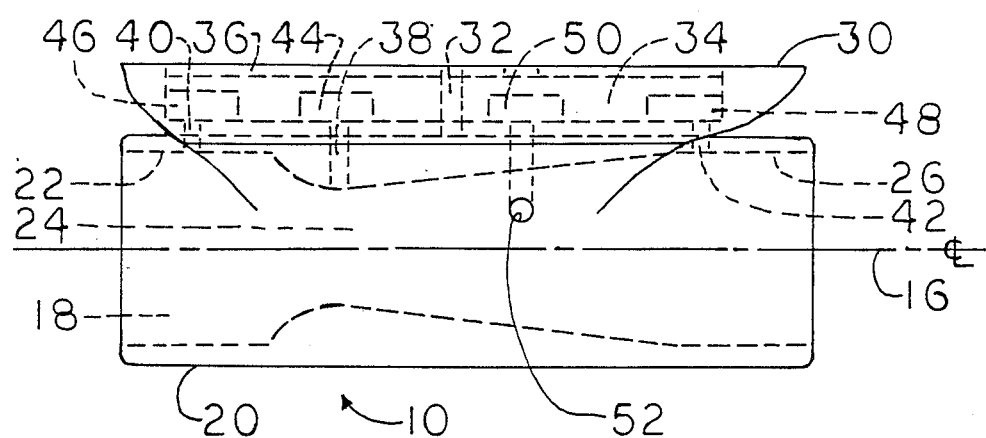
FIG. 3 is a side view of the venturi-transducer device.
Figure 4:
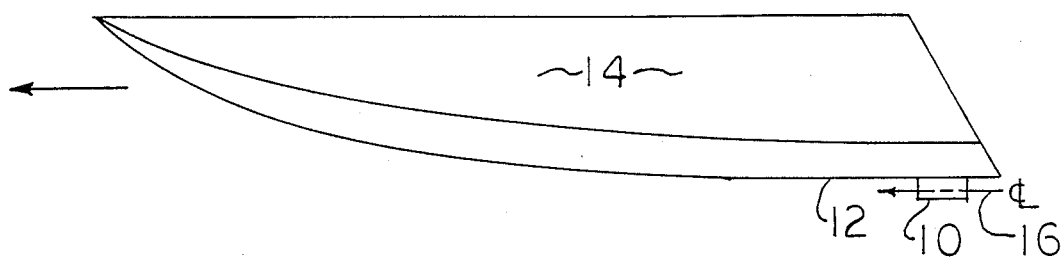
FIG. 4 is a side view of the venturi-transducer device mounted to the bottom of a boat hull.

Illustrated in FIGS. 1 through 3 is a venturi-transducer device generally denoted by 10 and in FIG. 4 the device 10 mounted on the bottom 12 of a boat hull 14. The device 10 is to be preferably mounted at a location on the hull 14 where there is total immersion at all likely speeds of the boat. In addition, the device 10 should be mounted such that the trim of the boat provides forward movement of the device parallel with a horizontal longitudinal axis 16 through the device under most operating conditions.

The device 10 comprises a venturi 18 within a generally tubular body 20, the venturi including an entrance portion 22, throat 24 and exit portion 26. The body 20 is integrally supported by streamlined webs 28 to a sensor or transducer plate 30 that is also streamlined for minimum disturbance to a fluid moving by the device 10. The plate 30 includes means 32 such as holes to attach with bolts to an adjacent boat hull 14 or other large surface thereadjacent.

Within the plate 30 is a cavity 34 having a cover 36. Communicating between the throat 24 and the cavity 34 is a throat port 38. Optionally, also communicating with the cavity 34 are an entrance port 40 and exit port 42 to the venturi entrance 22 and exit 26 respectively. Within the cavity 34 and covering each port are transducers 44, 46 and 48 to sense the static fluid pressure at each port. Also a temperature sensor 50 is included in the cavity 34 and extends to the surface of some portion of the body 20, web 28 or plate 30. As shown the temperature sensor 50 extends to the surface of the web 28 at 52.

Figure 5:
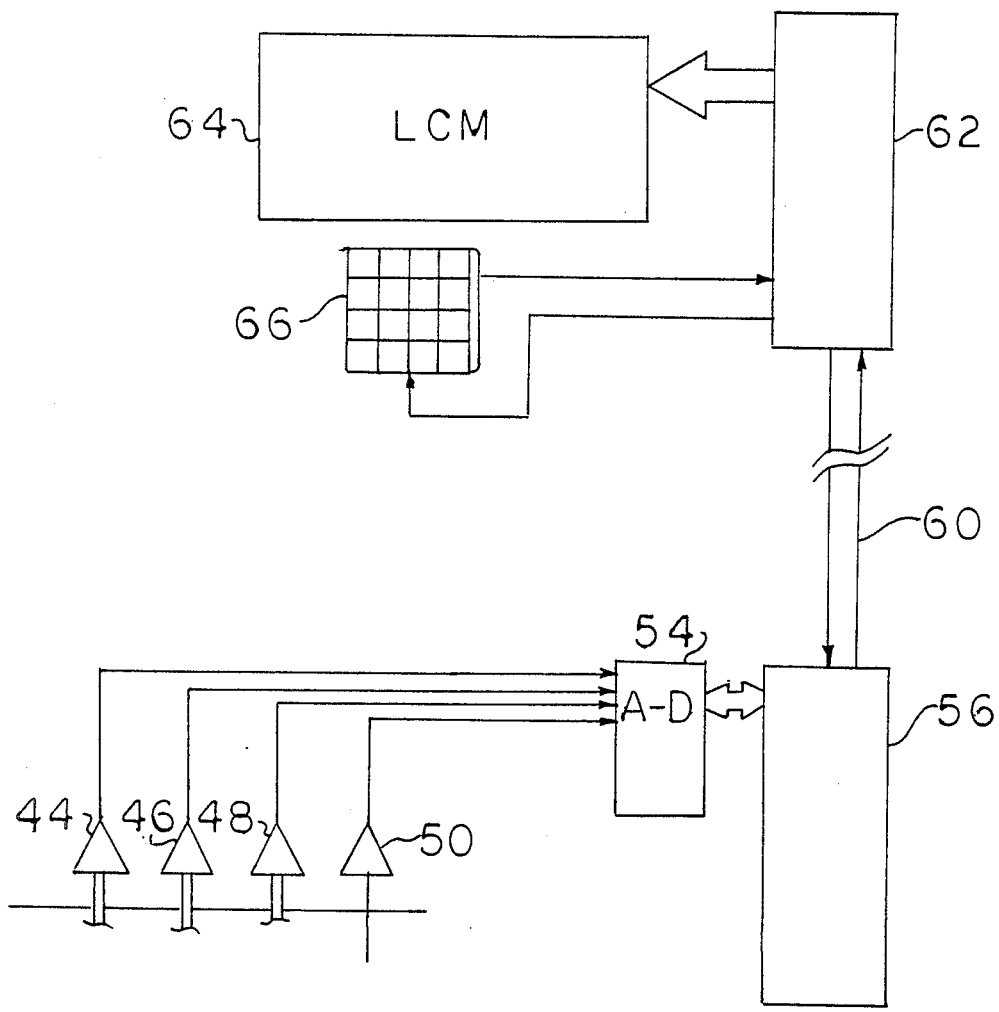
FIG. 5 is a block diagram of the microprocessor based display means for the device.

Illustrated in FIG. 5 are the static pressure transducers 44, 46 and 48 connected to an analog to digital converter 54 and in turn to a micro-controller 56. Also shown is the temperature sensor 50 connected to the analog-digital converter 54 and micro-controller 56. As with the transducers 44, 46, 48 and 50 the converter 54 and micro-controller 56 may be located in the cavity 34 of plate 30 and completely sealed ("potted") in a water impermeable material. An electrical port 58 from the cavity 34 as shown in FIG. 2 is provided for connection of an electric cable 60 to the inside of the boat hull 14.

The cable 60 provides any necessary power to the electric elements in the cavity 34 and provides a data link to a micro-controller 62 and a liquid crystal display 64. A key pad 66 is optionally connected to micro-controller 62 for entry of requests to reset the display, integrate the speed of the boat over time, display time and temperature or display other data derived from the transducers in the device 10 in addition to the speed of the boat.

Figure 6A:
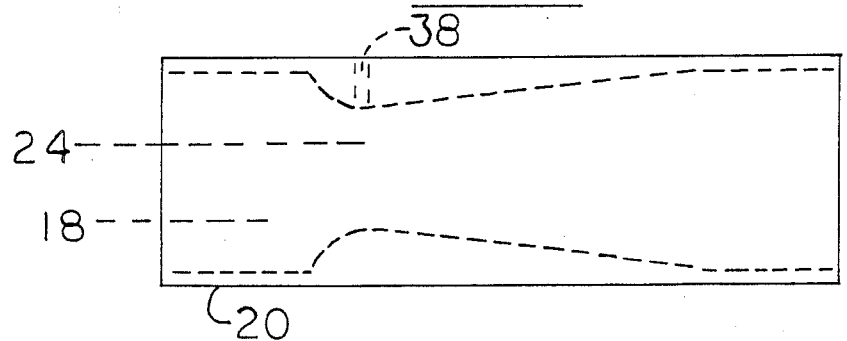
FIGS. 6a, 6b and 6c illustrate schematically three differing venturi-transducer devices.
Figure 6B:
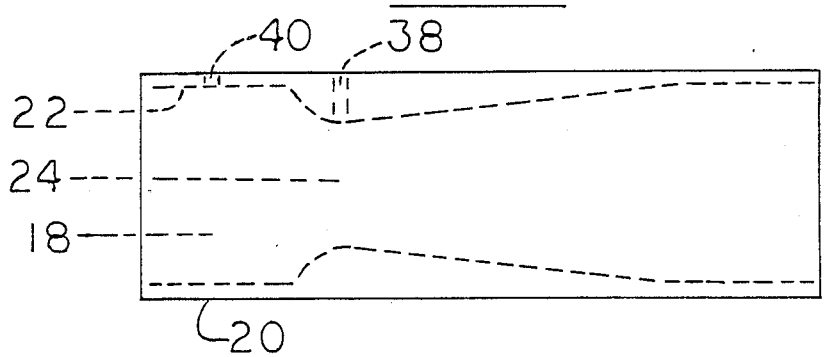
Figure 6C:
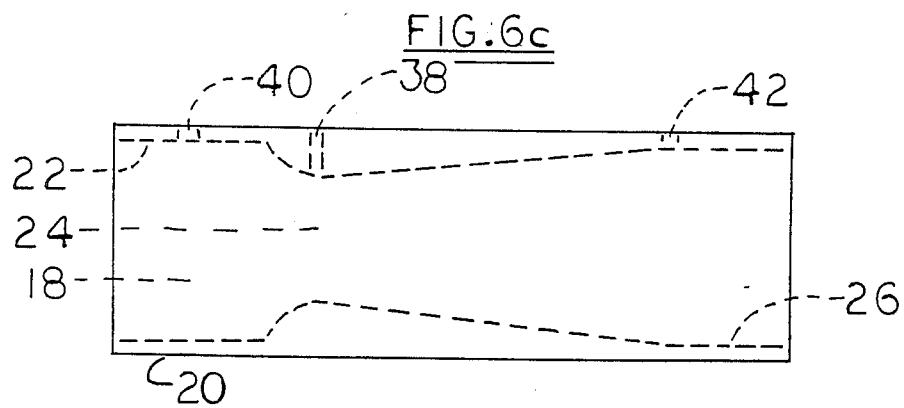

In FIGS. 6a, 6b and 6c three port configurations for the venturi are shown. To determine the speed of the device 10 through the water, the differential static pressure between the throat 24 measured at port 38 and the static pressure a sufficient distance upstream or downstream from the throat are applied to a mathematical expression which with suitable calculation results in the speed of the boat hull 14 through the water. With the micro-controllers suitably preprogrammed a substantially continuous readout of the instantaneous speed can be displayed. In FIG. 6a a single port 38 at the throat provides the instantaneous throat static pressure. The reference static pressure is provided by a precalculated static pressure such as the static pressure of undisturbed water at the same depth as the device 10. This reference static pressure may be corrected for temperature and salinity.

The reference static pressure may also be derived from an entrance port 40 in FIG. 6b where the water is relatively undisturbed and has been only slightly accelerated relative to the boat hull 14. Or, the reference static pressure may be derived from an exit port 42 in FIG. 6c where the water, having passed through the throat, has decelerated almost to the undisturbed state relative to the boat hull.

Figure 7:
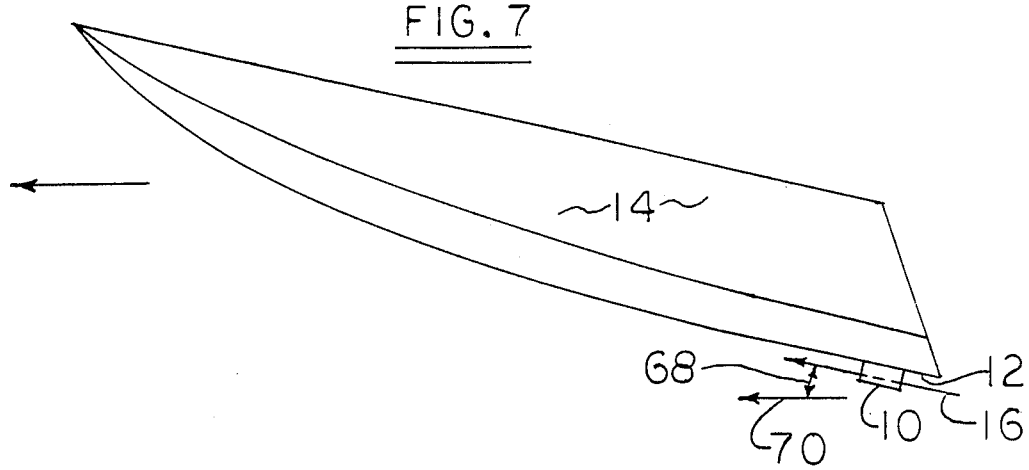
FIG. 7 is a side view illustrating the effect of pitch on the venturi-transducer device mounted on a boat hull.

The version of FIG. 6c, however, with the use of three ports and transducers can be used to indicate that the pitch or trim of the boat hull has changed an amount sufficient to significantly affect the accuracy of the device 10. The differential static pressure between the entrance port 40 and exit port 42 provides a measure of the energy loss or flow efficiency through the venturi. As the axis or centerline 16 of the venturi is angularly displaced 68 from parallelism with the direction of boat hull movement 70 as shown in FIG. 7, the energy loss increases and flow efficiency decreases. This is reflected in an increase in the differential static pressure between ports 40 and 42. The micro-controller and display can substantially continuously display the flow efficiency and signal an alarm when the efficiency drops below a preset value.

Although disclosed in terms of the application to a boat hull to determine hull speed and pitch, the device is equally applicable to other applications wherein a relatively large surface is moved through a stationary fluid in a direction reasonably parallel to the surface.

I claim:

1. A speed measuring device comprising a venturi, support means extending from the venturi, said support means adapted for attachment to a surface substantially parallel to the axis of the venturi, first transducer means in fluid communication with the throat of the venturi, said transducer means adapted to sense the static fluid pressure in the throat, differential comparison means in communication with the transducer means, said differential comparison means adapted to compare the static fluid pressure sensed by the transducer means with a reference static fluid pressure, a second transducer means in fluid communication with the entrance to the venturi, said second transducer means adapted to sense the fluid static pressure at the venturi entrance to provide a reference static fluid pressure to the differential comparison means, a third transducer means in fluid communication with the exit from the venturi, said third transducer means adapted to sense the fluid static pressure at the venturi exit to provide an exit static fluid pressure to the differential comparison means, said differential comparison means adapted to compare the static fluid pressure at the exit with the reference static fluid pressure, wherein said transducer means provide electric signals to the differential comparison means and the differential comparison means provide a first output signal proportional to the velocity of the venturi support relative to the fluid ahead of the entrance to the venturi and a second output signal proportional to the operating efficiency decrease of the venturi and including a display connected to the differential comparison means, said display adapted to indicate said relative velocity of the venturi support to the fluid and the operating efficiency decrease of the venturi.

2. The speed measuring device of claim 1 wherein said differential comparison means includes means to integrate said output signal over time to display distance travelled on said display.

3. The speed measuring device of claim 1 wherein said support means includesa cavity, a port providing fluid communication between the throat and the transducer means, the transducer means covering the cavity end of said port.

4. The speed measuring device of claim 1 wherein said support means includes a cavity, a plurality of ports providing fluid communications between the venturi and the transducers, the transducers covering the cavity ends of said ports.

* * * * *